US012633092B2

(12) United States Patent
Ji et al.

(10) Patent No.: US 12,633,092 B2
(45) Date of Patent: May 19, 2026

(54) TRAINING METHOD AND APPARATUS FOR IMAGE-TEXT MATCHING MODEL, DEVICE AND STORAGE MEDIUM

(71) Applicants:Beijing BOE Technology Development Co., Ltd., Beijing (CN); BOE Technology Group Co., Ltd., Beijing (CN)

(72) Inventors: Chao Ji, Beijing (CN); Ge Ou, Beijing (CN); Chuqian Zhong, Beijing (CN); Pengfei Zhang, Beijing (CN); Boran Jiang, Beijing (CN); Shuqi Wei, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 419 days.

(21) Appl. No.: 18/280,299

(22) PCT Filed: Sep. 30, 2022

(86) PCT No.: PCT/CN2022/123188
§ 371 (c)(1),
(2) Date: Sep. 5, 2023

(87) PCT Pub. No.: WO2024/065645
PCT Pub. Date: Apr. 4, 2024

(65) Prior Publication Data
US 2025/0054280 A1 Feb. 13, 2025

(51) Int. Cl.
*G06V 10/774* (2022.01)
*G06F 40/279* (2020.01)
*G06V 10/40* (2022.01)

(52) U.S. Cl.
CPC .......... *G06V 10/774* (2022.01); *G06F 40/279* (2020.01); *G06V 10/40* (2022.01)

(58) Field of Classification Search
CPC ...... G06V 10/774; G06V 10/40; G06V 10/70; G06V 10/82; G06F 40/279; G06F 16/583
See application file for complete search history.

(56) References Cited

U.S. PATENT DOCUMENTS 10,445,431 B1 * 10/2019 Lev-Tov ............... G06F 40/253
11,954,151 B1 * 4/2024 Jain ....................... G06F 16/783
(Continued)

FOREIGN PATENT DOCUMENTS

CN 112990297 A 6/2021
CN 114091427 A 2/2022
(Continued)

OTHER PUBLICATIONS

PCT/CN2022/123188 international search report, Jan. 18, 2023.
PCT/CN2022/123188 Written Opinion, Jan. 18, 2023.

*Primary Examiner* — Aaron W Carter
(74) *Attorney, Agent, or Firm* — IPro, PLLC

(57) ABSTRACT

The present disclosure provides a training method and apparatus for an image-text matching model, a device and a storage medium. The method includes: acquiring a positive sample and a negative sample; where the positive sample includes text and an image, the text in the positive sample is used to describe content of the image in the positive sample; the negative sample includes text and an image, the text in the negative sample describes content that is inconsistent with content of the image in the negative sample; training the image-text matching model by using the acquired positive sample and the acquired negative sample based on a manner of contrastive learning; where the image-text matching model is used to predict, for an input image and input (Continued)

Acquire a positive sample and a negative sample — S101

Train the image-text matching model by using the acquired positive sample and the acquired negative sample based on a manner of contrastive learning — S102 text, whether the input text is used to describe content of the input image.

14 Claims, 1 Drawing Sheet

(56)                 References Cited

U.S. PATENT DOCUMENTS

| | | | | |
|---|---|---|---|---|
| 12,223,439 | B2 * | 2/2025 | Yuan | G06N 20/00 |
| 12,475,383 | B1 * | 11/2025 | Yan | G06F 40/30 |
| 2015/0110387 | A1 * | 4/2015 | Lienhart | G06F 18/211 |
| | | | | 382/159 |
| 2016/0379091 | A1 * | 12/2016 | Lin | G06V 10/776 |
| | | | | 382/156 |
| 2018/0232451 | A1 * | 8/2018 | Lev-Tov | G06N 3/0464 |
| 2020/0111206 | A1 * | 4/2020 | Yati | G06F 18/22 |
| 2020/0167578 | A1 * | 5/2020 | Ding | G06V 20/58 |
| 2020/0193491 | A1 * | 6/2020 | Hu | G06V 30/19147 |
| 2020/0380027 | A1 * | 12/2020 | Aggarwal | G06N 3/044 |
| 2020/0380298 | A1 * | 12/2020 | Aggarwal | G06F 18/2148 |
| 2021/0264227 | A1 * | 8/2021 | Ma | G06N 3/0442 |
| 2022/0284321 | A1 | 9/2022 | Yuan et al. | |
| 2023/0005284 | A1 * | 1/2023 | He | G06F 16/58 |
| 2023/0075862 | A1 * | 3/2023 | Uzkent | G06F 16/5866 |
| 2023/0100376 | A1 * | 3/2023 | Liu | G06F 40/30 |
| | | | | 704/9 |
| 2023/0153606 | A1 * | 5/2023 | Min | G06N 3/08 |
| | | | | 706/25 |
| 2023/0215162 | A1 * | 7/2023 | Kim | G06V 10/82 |
| | | | | 382/157 |
| 2023/0360365 | A1 * | 11/2023 | Minderer | G06V 10/82 |
| 2024/0096121 | A1 * | 3/2024 | Yuan | G06V 10/467 |
| 2024/0161264 | A1 * | 5/2024 | Chandrasekaran | G06T 7/0004 |
| 2024/0203097 | A1 * | 6/2024 | Liu | G06V 10/762 |
| 2024/0289999 | A1 * | 8/2024 | Yi | G06T 11/00 |
| 2024/0320253 | A1 * | 9/2024 | Hong | G06F 16/3344 |
| 2025/0029289 | A1 * | 1/2025 | Bai | G06T 11/00 |
| 2025/0037443 | A1 * | 1/2025 | Ji | G06F 18/00 |
| 2025/0054280 | A1 * | 2/2025 | Ji | G06V 10/70 |
| 2025/0124730 | A1 * | 4/2025 | Du | G06V 10/44 |
| 2025/0153736 | A1 * | 5/2025 | Pan | G06V 10/82 |
| 2025/0265687 | A1 * | 8/2025 | Zhu | G06T 5/00 |

FOREIGN PATENT DOCUMENTS

| | | |
|---|---|---|
| CN | 114579762 A | 6/2022 |
| CN | 114782722 A | 7/2022 |
| CN | 114841243 A | 8/2022 |

* cited by examiner

TRAINING METHOD AND APPARATUS FOR IMAGE-TEXT MATCHING MODEL, DEVICE AND STORAGE MEDIUM

CROSS-REFERENCE TO RELATED APPLICATIONS

This application is a national stage of international PCT Application No. PCT/CN2022/123188 filed on Sep. 30, 2022, the entire contents of which are incorporated herein by reference.

TECHNICAL FIELD

The present disclosure relates to the technical field of artificial intelligence, and in particular, to a training method and apparatus for an image-text matching model, a device and a storage medium.

BACKGROUND

At present, a need for image-text matching is usually presented in multi-modal learning. For an image and a piece of text, it may be determined whether the piece of text is similar to content description of the image, so as to achieve association between the image and the piece of text.

However, during training of an image-text matching model, it is hard to collect training samples. Generally, text description is manually performed on an image to obtain corresponding matching text. Thus, there are only few training samples, leading to poor training effect for the image-text matching model.

SUMMARY

The present disclosure provides a training method and apparatus for an image-text matching model, a device and a storage medium, so as to solve deficiencies in related arts.

According to a first aspect of the present disclosure, a training method for an image-text matching model is provided, including:

acquiring a positive sample and a negative sample; where the positive sample includes text and an image, the text in the positive sample is used to describe content of the image in the positive sample; the negative sample includes text and an image, the text in the negative sample describes content that is inconsistent with content of the image in the negative sample;

training the image-text matching model by using the acquired positive sample and the acquired negative sample based on a manner of contrastive learning;

where the image-text matching model is used to predict, for an input image and input text, whether the input text is used to describe content of the input image.

Optionally, the image-text matching model includes: a text representation layer and an image representation layer;

the image-text matching model is used to: for the input text and the input image, acquiring a text feature of the input text by using the text representation layer, acquiring an image feature of the input image by using the image representation layer, and predicting whether the input text is used to describe the content of the input image based on the acquired text feature and the acquired image feature.

Optionally, acquiring the positive sample and the negative sample includes:

acquiring a set of image-text corresponding relations; where in any one of the image-text corresponding relations, text is used to describe content of a corresponding image;

generating the positive sample and the negative sample based on the set of the image-text corresponding relations; where the positive sample includes: text and an image belong to a same image-text corresponding relation; the negative sample includes: text and an image belong to different image-text corresponding relations; content described by the text in the negative sample is inconsistent with content of the image in the negative sample.

Optionally, generating the positive sample and the negative sample based on the set of the image-text corresponding relations includes:

determining multiple corresponding relations in the set of the image-text corresponding relations, where any two of the determined multiple corresponding relations have different images and text;

for any corresponding relation in the multiple corresponding relations, generating one positive sample based on text and an image in the corresponding relation;

based on the text in the corresponding relation and an image in another corresponding relation in the multiple corresponding relations, generating one negative sample.

Optionally, generating the positive sample and the negative sample based on the set of the image-text corresponding relations includes:

determining N corresponding relations in the set of image-text corresponding relations, where any two of the determined N corresponding relations have different images and text;

for each of the N corresponding relations, generating one positive sample based on text and an image in the corresponding relation; and generating N–1 negative samples based on the text in the corresponding relation and images in other N–1 corresponding relations in the N corresponding relations.

Optionally, the text in the positive sample is used to describe at least one of an entity category or an entity attribute in the image in the positive sample; the text in the negative sample describes at least one of an entity category or an entity attribute that is/are inconsistent with an entity in the image in the negative sample.

Optionally, in any one of the image-text corresponding relations, text is used to describe an entity category and an entity attribute in a corresponding image;

where generating the positive sample and the negative sample based on the set of the image-text corresponding relations includes:

determining corresponding relations with a same entity category and different entity attributes in the set of the image-text corresponding relations as a first sub-set; generating a first set of positive and negative samples based on the first sub-set;

determining corresponding relations with different entity categories and a same entity attribute in the set of the image-text corresponding relations as a second sub-set; generating a second set of positive and negative samples based on the second sub-set;

determining corresponding relations with different entity categories and different entity attributes in the set of the image-text corresponding relations as a third sub-set; generating a third set of positive and negative samples based on the third sub-set.

Optionally, a first loss weight is smaller than a second loss weight, the second loss weight is smaller than a third loss weight; where the first loss weight is a weight of a loss function when the first set of positive and negative samples is used to train the image-text matching model; the second loss weight is a weight of a loss function when the second set of positive and negative samples is used to train the image-text matching model; the third loss weight is a weight of a loss function when the third set of positive and negative samples is used to train the image-text matching model.

Optionally, the text representation layer is used to extract entity feature information in the input text.

Optionally, the text representation layer is used to perform text coding on the input text, and extract the entity feature information based on a result of the text coding.

Optionally, before training the image-text matching model, the method further includes:

determining a position of at least one entity in a to-be-trained image according to entity information in first text for describing content of the to-be-trained image in advance;

masking at least one entity in the to-be-trained image to obtain at least one to-be-recovered image;

training the image representation layer in advance by taking the at least one to-be-recovered image as a sample feature and taking the to-be-trained image as a sample label.

Optionally, before training the image-text matching model, the method further includes:

for a masked entity in any one of the at least one to-be-recovered image, masking information of the entity in the first text to obtain to-be-recovered text;

training the text representation layer in advance by taking the to-be-recovered text as a sample feature and taking the first text as a sample label.

According to a second aspect of the present disclosure, a training apparatus for an image-text matching model is provided, including:

a sample unit, configured to acquire a positive sample and a negative sample; where the positive sample includes text and an image, the text in the positive sample is used to describe content of the image in the positive sample; the negative sample includes text and an image, the text in the negative sample describes content that is inconsistent with content of the image in the negative sample;

a training unit, configured to train the image-text matching model by using the acquired positive sample and the acquired negative sample based on a manner of contrastive learning;

where the image-text matching model is used to predict, for an input image and input text, whether the input text is used to describe content of the input image.

Optionally, the image-text matching model includes: a text representation layer and an image representation layer;

the image-text matching model is used to: for the input text and the input image, acquire a text feature of the input text by using the text representation layer, acquire an image feature of the input image by using the image representation layer, and predict whether the input text is used to describe the content of the input image based on the acquired text feature and the acquired image feature.

Optionally, the sample unit is configured to:

acquire a set of image-text corresponding relations; where in any one of the image-text corresponding relations, text is used to describe content of a corresponding image;

generate the positive sample and the negative sample based on the set of the image-text corresponding relations; where the positive sample includes: text and an image belong to a same image-text corresponding relation; the negative sample includes: text and an image belong to different image-text corresponding relations; content described by the text in the negative sample is inconsistent with content of the image in the negative sample.

Optionally, the sample unit is configured to:

determine multiple corresponding relations in the set of the image-text corresponding relations, where any two of the determined multiple corresponding relations have different images and text;

for any corresponding relation in the multiple corresponding relations, generate one positive sample based on text and an image in the corresponding relation;

for the text in the corresponding relation and an image in another corresponding relation in the multiple corresponding relations, generate one negative sample.

Optionally, the sample unit is configured to:

determine N corresponding relations in the set of image-text corresponding relations, where any two of the determined N corresponding relations have different images and text;

for each of the N corresponding relations, generate one positive sample based on text and an image in the corresponding relation; and generate N–1 negative samples based on the text in the corresponding relation and images in other N–1 corresponding relations in the N corresponding relations.

Optionally, the text in the positive sample is used to describe at least one of an entity category or an entity attribute in the image in the positive sample; the text in the negative sample describes at least one of an entity category or an entity attribute that is/are inconsistent with an entity in the image in the negative sample.

Optionally, in any one of the image-text corresponding relations, text is used to describe an entity category and an entity attribute in a corresponding image; The sample unit is configured to:

determine corresponding relations with a same entity category and different entity attributes in the set of the image-text corresponding relations as a first sub-set; generating a first set of positive and negative samples based on the first sub-set;

determine corresponding relations with different entity categories and a same entity attribute in the set of the image-text corresponding relations as a second sub-set; generating a second set of positive and negative samples based on the second sub-set;

determine corresponding relations with different entity categories and different entity attributes in the set of the image-text corresponding relations as a third sub-set; generating a third set of positive and negative samples based on the third sub-set.

Optionally, a first loss weight is smaller than a second loss weight, the second loss weight is smaller than a third loss weight; where the first loss weight is a weight of a loss function when the first set of positive and negative samples is used to train the image-text matching model; the second loss weight is a weight of a loss function when the second set of positive and negative samples is used to train the image-text matching model; the third loss weight is a weight of a loss function when the third set of positive and negative samples is used to train the image-text matching model.

Optionally, the text representation layer is used to extract entity feature information in the input text.

Optionally, the text representation layer is used to perform text coding on the input text, and extract the entity feature information based on a result of the text coding.

Optionally, the apparatus further includes an image pre-training unit, configured to: before the image-text matching model is trained, determine a position of at least one entity in a to-be-trained image according to entity information in first text for describing content of the to-be-trained image in advance;

mask at least one entity in the to-be-trained image to obtain at least one to-be-recovered image;

train the image representation layer in advance by taking the at least one to-be-recovered image as a sample feature and taking the to-be-trained image as a sample label.

Optionally, the apparatus further includes a text pre-training unit, configured to: for a masked entity in any one of the at least one to-be-recovered image, mask information of the entity in the first text to obtain to-be-recovered text;

train the text representation layer in advance by taking the to-be-recovered text as a sample feature and taking the first text as a sample label.

As can be known according to the above embodiments, the image-text matching model is trained by using the positive sample and the negative sample and in a manner of contrastive learning, so that a number of samples is increased by introducing the negative sample, thereby improving training effect of the image-text matching model.

It shall be understood that, the above general description and detailed description in the following are only exemplary and illustrative, which cannot limit the present disclosure.

BRIEF DESCRIPTION OF DRAWINGS

The accompanying drawings, which are incorporated in and constitute a part of the present specification, illustrate embodiments consistent with the present disclosure, and together with the description, serve to illustrate principles of the present disclosure.

DETAILED DESCRIPTION

Figure 1:
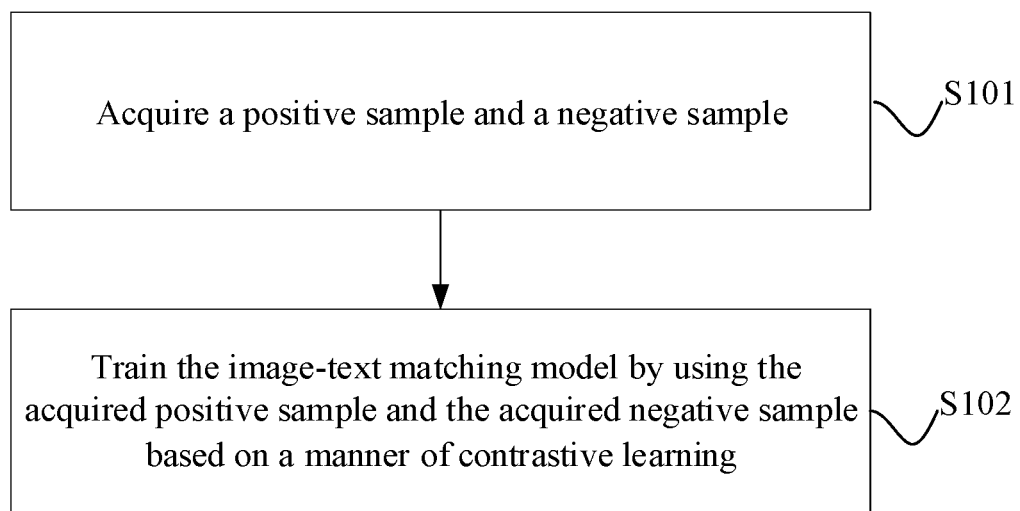
FIG. 1 is a schematic flowchart of a training method for an image-text matching model provided by an embodiment of the present disclosure.

Description will now be made in detail to illustrative embodiments, examples of which are shown in the accompanying drawings. When the following description refers to the drawings, unless otherwise indicated, same reference numerals in different drawings indicate the same or similar elements. Embodiments described in the following illustrative embodiments do not represent all embodiments consistent with the present disclosure. In contrary, they are merely examples of apparatuses and methods consistent with some aspects of the present disclosure as described in detail in the appended claims.

In multi-modal learning, a need for image-text matching is usually presented. For an image and a piece of text, it may be determined whether the piece of text is similar to content description of the image, so as to achieve association between the image and the piece of text.

However, during training of an image-text matching model, it is hard to collect training samples. Manual description for an image in text is usually needed to obtain corresponding matching text. Thus, there are only few training samples, leading to poor training effect for the image-text matching model.

An embodiment of the present disclosure provides a training method for an image-text matching model.

In the method, the image-text matching model can be trained in a manner of contrastive learning, and thus positive and negative samples are needed for the contrastive learning.

A positive sample includes text and an image, where the text may be used to describe content in the image, and thus it can be determined that an association between the text and the image in the positive sample is presented.

For example, a positive sample may include: an image showing "a man is playing with a dog", and text of "a man is playing with a dog".

A negative sample includes text and an image, the text in the negative sample is inconsistent with content of the image in the negative sample, and thus it can be determined that there is no association between the text and the image in the negative sample.

For example, a negative sample may include: an image showing "a man is playing with a dog", and text of "store purchasing".

Compared with the positive sample, the negative sample is easier to be acquired.

For example, based on a positive sample, text included therein can be replaced with various different text to generate a plurality of negative samples.

Therefore, the image-text matching model can be trained by using the positive and negative samples and in a manner of contrastive learning, so it is convenient to increase a number of negative samples, so as to increase a number of samples to improve training effect of the image-text matching model.

A training method for an image-text matching model provided by an embodiment of the present disclosure will be described in detail in the following.

As shown in FIG. 1, FIG. 1 is a schematic flowchart of a training method for an image-text matching model provided by an embodiment of the present disclosure.

An executive subject of the method is not limited by the embodiment of the present disclosure. Optionally, the executive subject may be any computer device. For example, a server for image-text matching.

The method may include following steps.

S101: acquiring a positive sample and a negative sample.

Optionally, the positive sample includes text and an image. The text included in the positive sample may be used to describe content of the image included in the positive sample.

Optionally, the negative sample includes text and an image. The text included in the negative sample may describe content inconsistent with content of the image included in the negative sample.

S102: training the image-text matching model by using the acquired positive sample and the acquired negative sample based on a manner of contrastive learning.

Optionally, the image-text matching model can be used to predict, for an input image and input text, whether the input text is used to describe content of the input image.

In a flow of the above method, the image-text matching model can be trained by using the positive sample and the negative sample and in a manner of contrastive learning, so that a number of samples is increased by introducing the negative sample, thereby improving training effect of the image-text matching model.

Since it is not difficult to acquire negative samples, a number of negative samples is easy to be increased, so as to increase a number of samples and further improve training effect of the image-text matching model.

Detailed description will be made for respective steps in the following.

I. S101: Acquiring a Positive Sample and a Negative Sample

The present method does not limit a number of acquired positive samples and a number of acquired negative samples. Optionally, at least one positive sample and at least one negative sample may be acquired.

Optionally, text included in any positive sample may be used to describe content of the image included in this positive sample. Text included in any negative sample may describe content inconsistent with content of the image included in this negative sample.

Optionally, text included in each positive sample may be used to describe content of the image included in this positive sample. Text included in each negative sample may describe content inconsistent with content of the image included in this negative sample.

The present method does not limit a specific manner of acquiring the positive sample and the negative sample, as long as text included in the positive sample can be used to describe content of the image included in the positive sample, and text included in the negative sample can describe content inconsistent with content of the image included in the negative sample.

Optionally, the positive sample may be acquired from network. Specifically, a corresponding image may be searched through network based on text, and the corresponding image can be taken as the image included in the positive sample.

For example, text "dog swimming" can be searched through network, so as to acquire an image showing "dog swimming", and then the positive sample can be generated by combining the text and the acquired image.

Optionally, the positive sample can also be directly acquired from a data set of matched images and text. Text included in each piece of data in the data set can be used to describe content of the image included in the piece of data.

Optionally, the positive sample can also be acquired by manually editing and generating text for describing content of an image, so as to obtain the positive sample by combining the image and the generated text.

For example, for an image showing "cat eating", text "cat eating" can be manually edited.

Optionally, the negative sample can be generated based on the positive sample. Specifically, the text included in the positive sample can be directly replaced with other text that is totally different, so as to obtain the negative text.

For example, for the text of "dog swimming" and the image showing "dog swimming", text of "cat eating" can be acquired and directly combined with the image showing "dog swimming" to obtain the negative sample. Acquired text may also be text that is totally irrelevant with "dog swimming", such as "fish swimming", "clouds" and "open window", etc.

Optionally, the negative sample may also be generated manually. Specifically, for an image, text totally irrelevant with the image may be generated through manual editing.

For example, for the image showing "cat eating", text such as "fish swimming" or "dog swimming", etc., may be manually edited, so that the negative sample can be obtained by combining the image and the manually edited text.

In an optional embodiment, a relation between text and an image may be acquired first, so as to generate the positive sample and the negative sample based on the relation, thereby improving efficiency of generating samples.

Optionally, acquiring the positive sample and the negative sample may include: acquiring a set of image-text corresponding relations; where in any one of the image-text corresponding relations, text is used to describe content of a corresponding image. The positive sample and the negative sample are generated according to the set of image-text corresponding relations.

The positive sample may include: text and an image belong to a same image-text corresponding relation; the negative sample may include: text and an image belong to different image-text corresponding relations; and content described by the text in the negative sample is inconsistent with content of the image in the negative sample.

For example, image-text corresponding relations may include: text "dog swimming" and an image showing "dog swimming", text "cat eating" and an image showing "cat eating", text of "yellow dog playing with a ball" and an image showing "yellow dog playing with a ball", etc.

Optionally, generating the positive sample and the negative sample according to the set of image-text corresponding relations may include: determining multiple corresponding relations in the set of the image-text corresponding relations, where any two of the determined multiple corresponding relations have different images and text; for any corresponding relation in the multiple corresponding relations, generating one positive sample based on text and an image in the corresponding relation; based on the text in the corresponding relation and an image in another corresponding relation in the multiple corresponding relations, generating one negative sample.

The image-text corresponding relation itself can represent that the text is used to describe content of the corresponding image in any one of the image-text corresponding relations. Hence, the text and the image included in any one of the corresponding relations can be combined as a positive sample.

For the generation of the negative sample, to improve efficiency, when the images and text in the determined multiple corresponding relations are different, an image and text belong to different corresponding relations respectively can be directly adopted and combined as a negative sample.

Optionally, for convenience of increasing a number of negative samples, negative samples can be generated for multiple times directly for a corresponding relation in the determined multiple corresponding relations.

Optionally, generating the positive sample and the negative sample according to the set of image-text corresponding relations may include: determining N corresponding relations in the set of the image-text corresponding relations, where any two of the determined N corresponding relations have different images and text; for each of the N corresponding relations, generating one positive sample based on text and an image in the corresponding relation; and generating N−1 negative samples based on the text in the N corresponding relation and images in other N−1 corresponding relations in the N corresponding relations.

The present embodiment can increase a number of generated negative samples and improve generating efficiency, so as to improve training effect of the image-text matching model.

In addition, in an optional embodiment, to improve training effect of the image-text matching model, image content described by text may include entity-related information in the image.

Since an entity feature in the image is easy to be extracted, the text can be defined to describe entity-related information in the corresponding image, so as to improve training effect of the image-text matching model.

Optionally, in any one of the image-text corresponding relations, text can be used to describe an entity category and an entity attribute in a corresponding image.

Optionally, the entity category may specifically be a category of an entity, such as, animal, plant, object, etc.; or cat, dog, bird, etc.

Optionally, the entity attribute may specifically be an attribute of an entity itself, such as color, size, etc.

Optionally, the text in the positive sample may be used to describe an entity category and/or an entity attribute in the image in the positive sample; the text in the negative sample may describe an entity category and/or an entity attribute that is/are inconsistent with an entity in the image in the negative sample.

Optionally, the text in any positive sample may be used to describe an entity category and/or an entity attribute in the image in the positive sample; the text in any negative sample may describe an entity category and/or an entity attribute that is/are inconsistent with an entity in the image in the negative sample.

Optionally, the text in each positive sample may be used to describe an entity category and/or an entity attribute in the image in the positive sample; the text in each negative sample may describe an entity category and/or an entity attribute that is/are inconsistent with an entity in the image in the negative sample.

Specifically, the entity category of the text included in the negative sample may be different from the entity category in the image included in the negative sample; or the entity attribute of the text included in the negative sample may be different from the entity attribute of the image included in the negative sample; or the entity category and the entity attribute of the text included in the negative sample may be different from the entity category and the entity attribute of the image included in the negative sample.

Optionally, since the acquired positive and negative samples are used for subsequent contrastive learning, a core concept of the contrastive learning may include: pull a distance between positive samples closer, and push a distance between a positive sample and a negative sample farther.

For the negative sample, compared to the entity attribute that is different from that of an entity of an image, the image-text matching model pays more attention on the entity category that is different from that of the entity of the image.

For example, a distance between a negative sample including an image showing "yellow dog swimming" and text of "black dog swimming" and a positive sample including an image showing "yellow dog swimming" and "yellow dog swimming" is closer than a distance between a negative sample including an image showing "yellow dog swimming" and text of "fish swimming" and the above positive sample. This is because the entity category of the text of "black dog swimming" and "yellow dog swimming" is same but the entity attributes thereof are different; while both the entity category and the entity attribute of the text of "fish swimming" and "yellow dog swimming" are different.

Therefore, negative samples can be divided, and the division of the negative samples and training of the model can be performed using different loss function weights, so as to increase attention level and recognition sensitivity of the image-text matching model on the "entity category", thereby improving training effect of the image-text matching model.

Optionally, generating the positive sample and the negative sample according to the set of image-text corresponding relations may include: determining corresponding relations with a same entity category and different entity attributes in the set of the image-text corresponding relations as a first sub-set; generating a first set of positive and negative samples based on the first sub-set;

determining corresponding relations with different entity categories and a same entity attribute in the set of the image-text corresponding relations as a second sub-set; generating a second set of positive and negative samples based on the second sub-set.

determining corresponding relations with different entity categories and different entity attributes in the set of the image-text corresponding relations as a third sub-set; generating a third set of positive and negative samples based on the third sub-set.

For example, corresponding relations of which text has the entity category of "dog" may be collected from the set of image-text corresponding relations, but "dog" in corresponding text has different entity attributes such as "yellow dog", "big dog", "black dog", etc. The first sub-set is thereby obtained, so as to generate the positive sample and the negative sample based on the first sub-set.

Corresponding relations of which text has the entity attribute of "yellow" may be collected from the set of image-text corresponding relations, but "yellow" in corresponding text has different entity categories such as "yellow dog", "yellow cat", "yellow fish", etc. The second sub-set is thereby obtained, so as to generate the positive sample and the negative sample based on the second sub-set.

Corresponding relations of which text has different entity categories and different entity attributes may be collected from the set of image-text corresponding relations, which may be "yellow dog", "black fish", "white cat", etc. The third sub-set is therefore obtained, so as to generate the positive sample and the negative sample based on the third sub-set.

In an optional embodiment, the above classified positive samples and negative samples may be used for model training respectively. Optionally, different loss functions may be adopted respectively for training of the image-text matching model.

Optionally, a first loss weight is smaller than a second loss weight, and the second loss weight is smaller than a third loss weight.

The first loss weight is a weight of a loss function when the first set of positive and negative samples is used to train the image-text matching model.

The second loss weight is a weight of a loss function when the second set of positive and negative samples is used to train the image-text matching model.

The third loss weight is a weight of a loss function when the third set of positive and negative samples is used to train the image-text matching model.

A manner of generating sets of positive and negative samples according to the first sub-set, the second sub-set and the third sub-set is not limited by the present embodiment Optionally, the first sub-set, the second sub-set and the third sub-set can be specifically considered as "multiple corresponding relations" determined in the above embodiments, so as to generate positive samples and negative samples.

In the first set of positive and negative samples, the negative sample includes text with the entity category same as the entity in the image, but with the entity attribute different from the entity in the image.

In the second set of positive and negative samples, the negative sample includes text with the entity category different from the entity in the image, but with the entity attribute same as the entity in the image.

In the third set of positive and negative samples, the negative sample includes text with the entity category different from the entity in the image, and with the entity attribute different from the entity in the image.

In the present embodiment, different kinds of negative samples can be distinguished, and different loss function weights are used for training of the image-text matching model, so as to improve attention level and recognition sensitivity of the image-text matching model on the "entity category", thereby improving training effect of the image-text matching model.

II. S102: Training the Image-Text Matching Model by Using the Acquired Positive Sample and the Acquired Negative Sample Based on a Manner of Contrastive Learning.

1. Image-Text Matching Model

The present method does not limit a specific structure of the image-text matching model.

Optionally, the image-text matching model may be a neural network model, or a model of other types.

Optionally, to achieve image-text matching, input of the image-text matching model may include an image and text that are to be matched. Therefore, the image-text matching model can set representation layers for inputs of two data types of image and text for feature extraction.

Optionally, the image-text matching model may include: a text representation layer and an image representation layer.

Optionally, the image-text matching model may be used to: for the input text and the input image, acquire a text feature of the input text by using the text representation layer, acquire an image feature of the input image by using the image representation layer, and predict whether the input text is used to describe the content of the input image based on the acquired text feature and the acquired image feature.

Optionally, the image-text matching model may further include an intermediate layer and an output layer. Specifically, the acquired text feature and image feature can be input into the intermediate layer for processing, and a processing result is input into the output layer, and the output layer outputs a prediction result. The prediction result can represent whether the input text is used to describe content of the input image.

Optionally, based on the acquired text feature and image feature, predicting whether the input text is used to describe the content of the input image may specifically include: combining the acquired text feature and image feature first, and then performing prediction based on a combined feature.

The present embodiment does not limit a manner of combining the text feature and the image feature. Optionally, the text feature and the image feature can be spliced, or a product of the text feature and the image feature can be calculated, or a sum of the text feature and the image feature can be calculated, etc.

Optionally, the intermediate layer of the image-text matching model can be used to combine the input text feature and image feature.

In the present embodiment, by combining the text feature and the image feature, text feature information and image feature information can be combined through the model, which brings convenience for learning and mining an association between the text and image.

The present method does not limit an output of the image-text matching model, as long as the output can be used to represent whether the input text is used to describe the content of the input image.

Optionally, specifically, the output can be a classification result of positive and negative samples, or a result of or a possibility of whether the image matches with the text, or a match level or a similarity between the "input image" and the "input text", etc.

The method also does not limit a structure of the intermediate layer and the output layer of the image-text matching model.

Optionally, the intermediate layer may specifically include a fully connected layer, and the output layer may specifically include a softmax layer.

The method also does not limit the text representation layer and the image representation layer in the image-text matching model. Specific description can be referred to from the following.

In addition, in an optional embodiment, in order to improve training effect and predict accuracy of the image-text matching model, the image-text matching model can be defined to mainly recognize whether entity-related information in the input text is in consistent with the entity in the input image.

Specifically, it may include recognition of whether the entity category and entity attribute in the input text are same as the entity category and the entity attribute in the input image.

Correspondingly, optionally, the output result of the image-text matching model may also be used to represent whether the entity category and entity attribute in the input text are same as the entity category and the entity attribute in the input image.

For example, the output result of the image-text matching model may include: the entity category and the entity attribute in the input text are same as the entity category and the entity attribute in the input image; the entity category in the input text is same as the entity category in the input image, but the entity attribute is different; the entity attribute in the input text is same as the entity attribute in the input image, but the entity category is different; the entity category and the entity attribute in the input text are different from the entity category and the entity attribute in the input image.

In the present embodiment, since features of the entities in the image and text are convenient of being extracted for recognition and matching, whether the input text is used to describe the content of the input image can be determined by mainly recognizing whether the entity information in the text and the image is same, so as to improve training effect and predict accuracy of the image-text matching model.

In a specific example, text with a fixed pattern can be preset, and entity-related information can be filled in for the text with the fixed pattern. For example, "There is an X in the image". X may include the entity-related information, and may specifically include the entity category, or the entity category and the entity attribute.

For example, "There is a cat in the image", "There is a pig in the image", "There is a dog in the image", "There is a yellow cat in the image", "There is a black dog in the image", "There is a big dog in the image", "There is a small cat in the image", etc.

A to-be-matched image can be matched with the above text with different entity-related information respectively, so as to determine text matching with the to-be-matched image according to a matching result (e.g., similarity between the image and the text). The entity-related information in the to-be-matched image is then determined.

Certainly, optionally, the entity category can be filled in a text pattern first, and then the text pattern is input into the image-text matching model for matching with the to-be-matched image, so as to determine whether a matched entity category is presented. After determining the matched entity category, the entity attribute is then filled in the text pattern, and the text pattern is input into the image-text matching model again for matching with the to-be-matched image, so as to determine whether a matched entity attribute is presented.

In the present embodiment, the entity category and the entity attribute and be matched respectively, so as to improve accuracy of the image-text matching model.

2. Contrastive Learning

The present method does not limit a manner of the contrastive learning.

Optionally, the image-text matching model can be trained by clustering the positive and negative samples respectively. Correspondingly, a loss function of the image-text matching model may include a cross-entropy function, so that classification of the positive and negative samples corresponding to the input image and text can be determined.

Optionally, the image-text matching model can be trained with a purpose of reducing distances of mapping results between different positive samples, and increasing distances of mapping results between positive and negative samples.

Optionally, specifically, a plurality of input positive samples can be mapped in a vector space through the image-text matching model, a value of the loss function is set to be in a positive correlation with distances between mapping results of the positive samples, so as to reduce the distances of the mapping results between the positive samples by reducing the value of the loss function.

Optionally, a plurality of input positive and negative samples can be mapped in a vector space, a value of the loss function is set to be in a positive correlation with distances between mapping results of the positive samples, and in a negative correlation with distances between mapping results of the positive samples and mapping results of the negative samples, so as to reduce the distances of the mapping results between the positive samples and increase the distances of the mapping results between the positive samples and the negative samples by reducing the value of the loss function.

3. Text Representation Layer and Image Representation Layer

The method does not limit a structure and a training manner of the text representation layer and the image representation layer.

Optionally, the image representation layer may include convolution layers; the text representation layer may also include convolution layers, and may also include self-attention mechanism layers, etc.

Optionally, training of the image representation layer and the text representation layer may be directly started along with the training of the image-text matching model, or may be performed in advance through samples, so as to determine fine initial parameters, and improve overall training effect of the image-text matching model.

The present method does not limit a manner of pre-training of the image representation layer and the text representation layer.

Optionally, an image model with service requirements may be trained by using image samples, and a representation layer therein may be extracted and taken as the image representation layer.

For example, image samples on which detection blocks have already been annotated may be used to train an image target detection model, so that a representation layer therein can be extracted. Image samples on which entity content tags have already been annotated may be used to train an image recognition model, so that a representation layer therein can be extracted.

Optionally, a text model with service requirements may also be trained by using text samples, and a representation layer therein may be extracted and taken as the text representation layer.

For example, text samples on which entity tags have already been annotated may be used to train a text entity information extraction model, so that the representation layer therein can be extracted. Text samples on which content tags have already been annotated may be used to train a text content extraction model, so that a representation layer therein can be extracted.

Optionally, the text representation layer can specifically use static coding, such as word2vec (a small parameter model), or dynamic coding, such as bert (a large parameter model).

In an optional embodiment, since the subsequent image-text matching model can pay more attention on the entity-related information in the input image and the input text, thus the text representation layer and the image representation layer can be used to extract the entity-related information.

Optionally, the text representation layer may be used to extract entity feature information in the input text.

Optionally, the text representation layer may be used to extract entity feature information for triple information (head entity, relation, tail entity) in the input text. The entity feature information may specifically include head entity feature information and tail entity feature information. Extraction of the entity feature information may specifically include coding of entity information. The entity feature information may include a coding result of the entity information.

Optionally, the text representation layer may be used to code triple information (head entity, relation, tail entity) in the input text, so as to obtain a head entity coding result and a tail entity coding result, and determine the head entity coding result and the tail entity coding result as the entity feature information.

Optionally, the text representation layer may be used to code entity information in the input text. The entity information may include triple information (head entity, relation, tail entity).

Optionally, the image representation layer may be used to extract entity feature information in the input image.

Optionally, the image representation layer may be used to extract a feature of the input image. The extracted image feature may include entity feature information of the image, or entity relation in the image.

The present embodiment does not limit a specific structure of the text representation layer.

Optionally, the text representation layer may be used to perform text coding on the input text, and extract the entity feature information based on a result of the text coding.

Optionally, the text representation layer may be used to perform text coding for the input text, and determine the entity information of the input text, and extract the entity feature information for a coding part corresponding to the entity information in the text coding result.

The present embodiment does not limit a manner of text coding. Any text coding model can be used for text coding. Optionally, text coding may be performed by using static coding, such as word2vec (a small parameter model), or dynamic coding, such as bert (a large parameter model), or models such as RNN (Recurrent Neural Network), CNN (Convolutional Neural Network), LSTM (Long-Short Term Memory), self-attention model, etc.

The present embodiment does not limit a manner of determining the entity information in the input text. Optionally, the entity information in the input text can be determined by adopting a knowledge graph, or can be determined by the text representation layer itself.

The triple (head entity, relation, tail entity) of the input text can be determined by adopting the knowledge graph.

The present embodiment does not limit a manner of extracting the entity feature information. Optionally, a knowledge graph embedding model (Translate algorithm) can be adopted for extracting the entity feature information.

The knowledge graph embedding model (Translate algorithm) may include models such as TransE, TransH, TransR and TransD, etc.

Optionally, extraction of the entity feature information may include coding of entity information in the input text. The coding may specifically include coding of the triple (head entity, relation, tail entity) in the input text.

Optionally, the triple in the input text can be specifically determined through the knowledge graph.

In the present embodiment, by coding the triple in the input text, a coding result (i.e., the entity feature) can include information of the knowledge graph. The information of the knowledge graph may include information of the triple, and may specifically include relation information between the head entity and the tail entity.

In a specific example, the triple can be extracted according to the text, so as to generate the knowledge graph. A representation form of the triple may be (head entity, relation, tail entity). For an example of "Alaskan Malamute plays with a ball", an extraction result may be (dog, play, ball). The Alaskan Malamute is an attribute of the dog.

The text representation layer can perform text coding for the input text, and then determine a coding part corresponding to the triple in the text, and then for the coding part corresponding to the triple in the text, project the head entity and the tail entity into a relation space through a projection matrix by using a pre-trained TransR model, to obtain a head entity mapping result and a tail entity mapping result that are taken as the entity feature information input into the text representation layer.

A training manner of the TransR model is: for each triple (h, r, t), the head entity and the tail entity are projected into the relation space through the projection matrix, to obtain the head entity mapping result and the tail entity mapping result.

A final evaluation function is:

$$f_r(h, t) = \|h_r + r - t_r\|_2^2$$

The model is trained to make the evaluation function take a minimum value.

In an optional embodiment, the image representation layer and the text representation can be pre-trained to make the entity feature representation more accurate.

Optionally, the text representation layer can be trained by adopting a manner of annotating entity tags on the text. Specifically, the annotation can be made in a manner of the knowledge graph.

Optionally, before the image-text matching model is trained, the method may further include: determining entity information included in to-be-trained text in advance; determining a corresponding entity tag according to the determined entity information; pre-training the text representation layer by using the to-be-trained text and the corresponding entity tag.

Specifically, pre-training the text representation layer may be pre-training a text entity information extraction model, and a representation part thereof is extracted and determined as the text representation layer.

The present embodiment does not limit a form of the entity information. Optionally, the entity information may include the entity category and/or the entity attribute.

Optionally, determining entity information included in to-be-trained text in advance and determining a corresponding entity tag according to the determined entity information may include: determining the head entity, the relation and the tail entity of the to-be-trained text; mapping the determined head entity and the tail entity into a relation space by using a pre-trained mapping model, to obtain the head entity feature and the tail entity feature; determining the head entity feature and the tail entity feature as the corresponding entity tag.

In the present embodiment, the head entity, the relation and the tail entity in the text are obtained by using the knowledge graph, to determine the entity information in the text, so as to obtain the entity feature through feature mapping, and take the entity feature as the tag.

In a specific example, the triple can be extracted according to the text, so as to generate the knowledge graph.

A representation form of the triple may be (head entity, relation, tail entity).

For an example of "Alaskan Malamute plays with a ball", an extraction result may be (dog, play, ball). The Alaskan Malamute is an attribute of the dog.

Triple embedding can be trained by using the TransR algorithm, and a specific training manner includes: for each triple (h, r, t), the head entity and the tail entity are projected into the relation space through the projection matrix, to obtain the head entity mapping result and the tail entity mapping result.

A final evaluation function is:

$$f_r(h, t) = \|h_r + r - t_r\|_2^2$$

The model is trained to make the evaluation function take a minimum value.

Afterwards, the trained TransR model can be used to output embedded representation of the entity combined with the knowledge graph information for the head entity and the tail entity in the text, so as to be taken as the entity information tag for training of the text representation layer.

Optionally, the image representation layer can be trained by adopting a manner of annotating entity tags on the image.

Optionally, images annotated with detection blocks of the entity information can also be directly acquired for training of the image representation layer. Specifically, an image entity information extraction model can be trained, and the representation part therein can be extracted and determined as the image representation layer.

Optionally, before training the image-text matching model, the method may further include: determining a position of at least one entity in a to-be-trained image according to entity information in first text for describing content of the to-be-trained image in advance; masking at least one entity in the to-be-trained image to obtain at least one to-be-recovered image; training the image representation layer in advance by taking the at least one to-be-recovered image as a sample feature and taking the to-be-trained image as a sample label. The image representation layer may be used to extract entity feature information in the input image.

The present embodiment does not limit a form of the entity information. Optionally, the entity information may include the entity category and/or the entity attribute.

Optionally, pre-training the image representation layer may include pre-training an image-recovering model, so that a representation part in the trained image-recovering model can be extracted and determined as the image representation layer.

Optionally, a backbone network in the image representation layer may select resnet (small parameter model), Vit (large parameter model), CNN model, Transformer model or self-attention model.

Optionally, corresponding masking on the to-be-trained image, the first text can also be masked for training of the text representation layer.

Optionally, before training of the image-text matching model, for a masked entity in any to-be-recovered image, information of the masked entity in the first text can be masked to obtain to-be-recovered text; the text representation layer is pre-trained by taking the obtained to-be-recovered text as the sample feature, and taking the first text as the sample label; the text representation layer can be used to extract the entity feature information in the input text.

Optionally, pre-training the text representation layer may include pre-training a text-recovering model, so that a representation part in the trained text-recovering model can be extracted and determined as the text representation layer.

In the present embodiment, a same entity in associated image and text can be masked for training, which can improve association between the entity feature information extracted by the text representation layer and the image representation layer, so as to improve association between the image representation result and the text representation result, thereby improving training effect of the model and accuracy of the image-text matching model.

In the above embodiment, by pre-training the image representation layer and the text representation layer, fine initial parameters can be obtained, so as to improve overall training effect of the image-text matching model compared with a condition that initial parameters are randomly determined.

In a condition that training of the image-text matching model is completed, embodiments of the present disclosure do not limit a specific using manner of the image-text matching model.

Optionally, the image-text matching model can be used to determine whether the input image matches with the input text. The image-text matching model can also be used to obtain text for describing content of the input image by using the input text matching with the input image, so as to extract content information in the image as the text.

In an optional embodiment, a to-be-matched image can be acquired; at least one piece of preset text including preset content information can be acquired; where the preset content information in different pieces of preset text is different. The to-be-matched image and the at least one piece of preset text are input into the image-text matching model.

Optionally, the image-text matching model is obtained by training according to the above method embodiments.

Afterwards, it can be determined whether a piece of preset text for describing content of the to-be-matched image is presented according to an output result of the image-text matching model.

Optionally, the preset content information may specifically include: entity information. The entity information may specifically include an entity category and/or an entity attribute.

Optionally, the preset text may include text obtained by filling in the entity information based on a preset text pattern. For example, the preset text pattern may be "There is an X in the image".

The present embodiment does not limit a form of an output result of the image-text matching model.

Optionally, the output result of the model may include: a matching level between the input text and the input image, or a prediction result representing whether the input text matches with the input image.

The present embodiment does not limit a manner of determining whether a piece of preset text for describing content of the to-be-matched image is presented according to an output result of the image-text matching model.

Optionally, according to the matching level output by the model, preset text with a matching level higher than a preset matching threshold and with the highest matching level can be determined. Preset content information included in the to-be-matched image can be determined according to the determined preset content information in the preset text.

Optionally, matched preset text can be determined according to the prediction result representing whether the input text matches with the input image output by the model. Preset content information included in the to-be-matched image can be determined according to the determined preset content information in the preset text.

According to the above method embodiments, embodiments of the present disclosure further provide apparatus embodiments.

Figure 2:
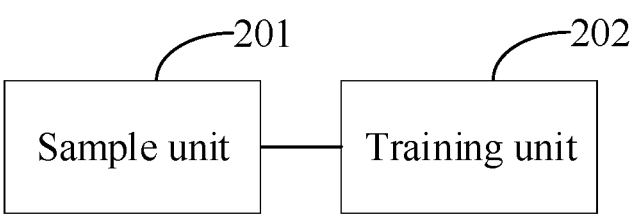
FIG. 2 is a schematic structural diagram of a training apparatus for an image-text matching model provided by an embodiment of the present disclosure.

As shown in FIG. 2, FIG. 2 is a schematic structural diagram of a training apparatus for an image-text matching model provided by an embodiment of the present disclosure.

The apparatus may include following units:

a sample unit 201, configured to acquire a positive sample and a negative sample; where the positive sample includes text and an image, the text in the positive sample is used to describe content of the image in the positive sample; the negative sample includes text and an image, the text in the negative sample describes content that is inconsistent with content of the image in the negative sample;

a training unit 202, configured to train the image-text matching model by using the acquired positive sample and the acquired negative sample based on a manner of contrastive learning;

where the image-text matching model is used to predict, for an input image and input text, whether the input text is used to describe content of the input image.

Optionally, the image-text matching model includes: a text representation layer and an image representation layer;

where the image-text matching model is used to: for the input text and the input image, acquire a text feature of the input text by using the text representation layer, acquire an image feature of the input image by using the image representation layer, and predict whether the input text is used to describe the content of the input image based on the acquired text feature and the acquired image feature.

Optionally, the sample unit 201 is configured to:

acquire a set of image-text corresponding relations; where in any one of the image-text corresponding relations, text is used to describe content of a corresponding image;

generate the positive sample and the negative sample based on the set of the image-text corresponding relations; where the positive sample includes: text and an image belong to a same image-text corresponding relation; the negative sample includes: text and an image belong to different image-text corresponding relations; content described by the text in the negative sample is inconsistent with content of the image in the negative sample.

Optionally, the sample unit 201 is configured to:

determine multiple corresponding relations in the set of the image-text corresponding relations, where any two of the determined multiple corresponding relations have different images and text;

for any corresponding relation in the multiple corresponding relations, generate one positive sample based on text and an image in the corresponding relation;

based on the text in the corresponding relation and an image in another corresponding relation in the multiple corresponding relations, generating one negative sample.

Optionally, the sample unit 201 is configured to:

determine N corresponding relations in the set of image-text corresponding relations, where any two of the determined N corresponding relations have different images and text;

for each of the N corresponding relations, generate one positive sample based on text and an image in the corresponding relation; and generate N−1 negative samples based on the text in the N corresponding relation and images in other N−1 corresponding relations in the N corresponding relations.

Optionally, the text in the positive sample may be used to describe an entity category and/or an entity attribute in the image in the positive sample; the text in the negative sample may describe an entity category and/or an entity attribute that is/are inconsistent with an entity in the image in the negative sample.

Optionally, in any one of the image-text corresponding relations, text is used to describe an entity category and an entity attribute in a corresponding image; the sample unit 201 is configured to:

determine corresponding relations with a same entity category and different entity attributes in the set of the image-text corresponding relations as a first sub-set; generating a first set of positive and negative samples based on the first sub-set;

determine corresponding relations with different entity categories and a same entity attribute in the set of the image-text corresponding relations as a second sub-set; generating a second set of positive and negative samples based on the second sub-set;

determine corresponding relations with different entity categories and different entity attributes in the set of the image-text corresponding relations as a third sub-set; generating a third set of positive and negative samples based on the third sub-set.

Optionally, a first loss weight is smaller than a second loss weight, the second loss weight is smaller than a third loss weight; where the first loss weight is a weight of a loss function when the first set of positive and negative samples is used to train the image-text matching model; the second loss weight is a weight of a loss function when the second set of positive and negative samples is used to train the image-text matching model; the third loss weight is a weight of a loss function when the third set of positive and negative samples is used to train the image-text matching model.

Optionally, the text representation layer is used to extract entity feature information in the input text.

Optionally, the text representation layer is used to perform text coding on the input text, and extract the entity feature information based on a result of the text coding.

Optionally, the above apparatus further includes a text pre-training unit 203, configured to pre-determine entity information included in to-be-trained text before training of the image-text matching model;

determining a corresponding entity tag according to the determined entity information;

pre-train the text representation layer by using the to-be-trained text and the corresponding entity tag.

Optionally, the text pre-training unit 203 is configured to:

determine a head entity, a relation and a tail entity included in the to-be-trained text;

map the determined head entity and the tail entity into a relation space by using a pre-trained mapping model, to obtain a head entity feature and a tail entity feature;

determine the obtained head entity feature and the tail entity feature as the corresponding entity tag.

Optionally, the apparatus further includes an image pre-training unit 204, configured to: before the image-text matching model is trained, determine a position of at least one entity in a to-be-trained image according to entity information in first text for describing content of the to-be-trained image in advance;

mask at least one entity in the to-be-trained image to obtain at least one to-be-recovered image;

train the image representation layer in advance by taking the at least one to-be-recovered image as a sample feature and taking the to-be-trained image as a sample label;

where the image representation layer is used to extract entity feature information in the input image.

Optionally, the apparatus further includes the text pre-training unit 203, configured to: for a masked entity in any one of the at least one to-be-recovered image, mask information of the entity in the first text to obtain to-be-recovered text;

train the text representation layer in advance by taking the to-be-recovered text as a sample feature and taking the first text as a sample label;

where, the text representation layer is used to extract entity feature information in the input text.

Specific description can be referred to from the above method embodiments.

Embodiments of the present disclosure further provide a computer device, including a memory, a processor, and a computer program stored on the memory and executable by the processor, where the processor executes the computer program to implement any one of the above method embodiments.

Embodiments of the present disclosure further provides an electronic device, including: at least one processor; and a memory communicatively connected with the at least one processor; where the memory stores an instruction executable by the at least one processor, and the instruction is executed by the at least one processor to cause the at least one processor to perform any one of the above method embodiments.

Figure 3:
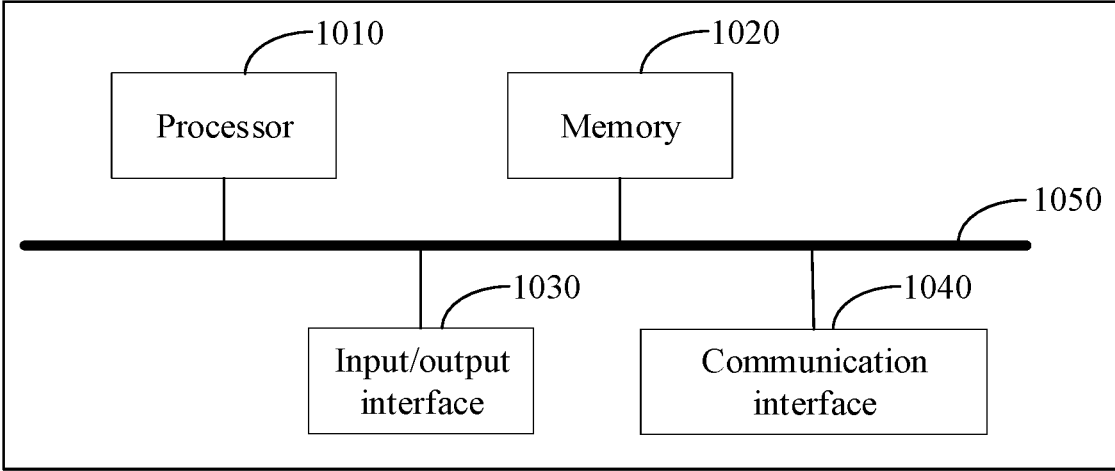
FIG. 3 is a schematic hardware structural diagram of a computer device for configuring a method of the embodiments of the present disclosure provided by an embodiment of the present disclosure.

FIG. 3 is a schematic hardware structural diagram of a computer device for configuring a method of the embodiments of the present disclosure provided by an embodiment of the present disclosure. The device may include: a processor 1010, a memory 1020, an input/output interface 1030, a communication interface 1014 and a bus 1050. The processor 1010, the memory 1020, the input/output interface 1030 and the communication interface 1040 communicate with each other through the bus 1050.

The processor 1010 can be realized by a general CPU (Central Processing Unit), a microprocessor, an application specific integrated circuit (ASIC), or one or more integrated circuits, etc., and is used for executing related programs to realize the technical solution provided by the embodiment of the present disclosure.

The memory 1020 can be implemented in a form of ROM (Read Only Memory), RAM (Random Access Memory), static storage device, dynamic storage device, etc. The memory 1020 can store a operating system and other application programs. When the technical solution provided by the embodiment of the present disclosure is realized by software or firmware, relevant program codes are stored in the memory 1020 and called and executed by the processor 1010.

The input/output interface 1030 is used to connect input/output modules to realize information input and output. Input/output modules can be configured as components in the device (not shown in the figure) or can be externally connected to the device to provide corresponding functions. Input devices may include keyboards, mice, touch screens, microphones, various sensors, etc., and output devices may include displays, speakers, vibrators, indicator lights, etc.

The communication interface 1040 is used to connect a communication module (not shown in the figure) to realize communication interaction between the device and other devices. The communication module can communicate by wired means (such as USB, network cable, etc.) or wireless means (such as mobile network, WIFI, Bluetooth, etc.).

The bus 1050 includes a path to transfer information between various components of the device, such as the processor 1010, the memory 1020, the input/output interface 1030 and the communication interface 1040.

It should be noted that although the above device only shows the processor 1010, the memory 1020, the input/output interface 1030, the communication interface 1040 and the bus 1050, in a specific implementation process, the device may also include other components necessary for normal operation. In addition, it can be understood by those of ordinary skills in the art that the above-mentioned device may also include only components necessary to realize the solution according to the embodiments of the present disclosure, and the device does not need to include all the components shown in the figure.

Embodiments of the present disclosure also provide a computer-readable storage medium, on which a computer program is stored, and when the program is executed by a processor, any of the above method embodiments is implemented.

Embodiments of the present disclosure also provide a computer-readable storage medium storing a computer program, and when the computer program is executed by a processor, any of the above method embodiments is implemented.

The computer-readable medium includes permanent and non-permanent medium, removable and non-removable medium, which can store information by any manner or technology. The information can be computer-readable instructions, data structures, modules of programs or other data. Examples of the computer storage medium include, but is not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies. CD-ROM, digital versatile disks (DVD) or other optical storage, magnetic cassettes, magnetic disk storage or other magnetic storage devices or any other non-transmission media can be used to store information that can be accessed by computing devices. According to the definition herein, the computer-readable medium does not include temporary computer-readable medium (transitory media), such as modulated data signals and carrier waves.

From the description of the above embodiments, those of ordinary skills in the art can clearly understand that the embodiments of the present disclosure can be realized by means of software and necessary general hardware platforms. Based on this understanding, the technical solution of the embodiment of the present disclosure can be embodied in a form of a software product, which can be stored in a storage medium, such as ROM/RAM, magnetic disk, optical disk, etc., and includes several instructions to make a computer device (which can be a personal computer, a server, or a network device, etc.) execute the methods described in various embodiments or some parts of the embodiments of the present disclosure.

The systems, devices, modules or units set forth in the above embodiments can be realized by computer chips or entities, or by products with certain functions. A typical implementation device is a computer, and the specific form of the computer can be a personal computer, a laptop computer, a cellular phone, a camera phone, a smart phone, a personal digital assistant, a media player, a navigation device, an email transceiver, a game console, a tablet computer, a wearable device or a combination of any of these devices.

Each embodiment in the specification is described in a progressive way, and only the same and similar parts between the embodiments can be referred to each other, and each embodiment focuses on the differences from other embodiments. Especially, for the apparatus embodiments, since they are basically similar to the method embodiments, the description thereof is relatively simple, and the relevant points can only be found in part of the description of the method embodiments. The apparatus embodiments described above are only schematic, where the modules described as separate components may or may not be physically separated, and the functions of each module can be realized in the same software and/or hardware when implementing the embodiment scheme of the present disclosure. Some or all of the modules can also be selected according to actual needs to achieve the purpose of this embodiment. Those of ordinary skills in the art can understand and implement without making creative efforts.

The above description is only specific implementations of the embodiments of the present disclosure. It should be noted that for those of ordinary skills in the art, several improvements and embellishments can be made without departing from the principle of the embodiments of the present disclosure, and these improvements and embellishments should also be regarded as the protection of the embodiments of the present disclosure.

In the present disclosure, terms "first" and "second" are only used for descriptive purposes and cannot be understood as indicating or implying relative importance. The term "a plurality of" refers to two or more, unless otherwise explicitly defined.

Other embodiments of the present disclosure will be readily apparent to those skilled in the art after considering the specification and practicing the disclosure disclosed herein. The present disclosure is intended to cover any variation, use or adaptation of the present disclosure, which follows the general principles of the present disclosure and includes common knowledge or common technical means in the technical field that are not disclosed in the present disclosure. The specification and examples are to be regarded as illustrative only, with the true scope and spirit of the disclosure being indicated by the following claims.

It should be understood that the present disclosure is not limited to the precise structure described above and shown in the drawings, and various modifications and changes can be made without departing from its scope. The scope of the present disclosure is limited only by the appended claims.

The invention claimed is:

1. A training method for an image-text matching model, comprising:

acquiring a positive sample and a negative sample; wherein the positive sample comprises text and an image, the text in the positive sample is used to describe content of the image in the positive sample; the negative sample comprises text and an image, the text in the negative sample describes content that is inconsistent with content of the image in the negative sample; and training the image-text matching model by using the acquired positive sample and the acquired negative sample based on a manner of contrastive learning;

wherein the image-text matching model is used to predict, for an input image and input text, whether the input text is used to describe content of the input image;

wherein acquiring the positive sample and the negative sample comprises:

acquiring a set of image-text corresponding relations; wherein in any one of the image-text corresponding relations, text is used to describe content of a corresponding image; and generating the positive sample and the negative sample based on the set of the image-text corresponding relations; wherein the positive sample comprises: text and an image belong to a same image-text corresponding relation; the negative sample comprises: text and an image belong to different image-text corresponding relations; content described by the text in the negative sample is inconsistent with content of the image in the negative sample;

wherein in any one of the image-text corresponding relations, text is used to describe an entity category and an entity attribute in a corresponding image;

wherein generating the positive sample and the negative sample based on the set of the image-text corresponding relations comprises:

determining corresponding relations with a same entity category and different entity attributes in the set of the image-text corresponding relations as a first sub-set; generating a first set of positive and negative samples based on the first sub-set;

determining corresponding relations with different entity categories and a same entity attribute in the set of the image-text corresponding relations as a second sub-set; generating a second set of positive and negative samples based on the second sub-set; and determining corresponding relations with different entity categories and different entity attributes in the set of the image-text corresponding relations as a third sub-set; generating a third set of positive and negative samples based on the third sub-set.

2. The method according to claim 1, wherein the image-text matching model comprises: a text representation layer and an image representation layer;

the image-text matching model is used to: for the input text and the input image, acquire a text feature of the input text by using the text representation layer, acquire an image feature of the input image by using the image representation layer, and predict whether the input text is used to describe the content of the input image based on the acquired text feature and the acquired image feature.

3. The method according to claim 2, wherein the text representation layer is used to extract entity feature information in the input text.

4. The method according to claim 3, wherein the text representation layer is used to perform text coding on the input text, and extract the entity feature information based on a result of the text coding.

5. The method according to claim 2, wherein before training the image-text matching model, the method further comprises:

determining a position of at least one entity in a to-be-trained image according to entity information in first text for describing content of the to-be-trained image in advance;

masking at least one entity in the to-be-trained image to obtain at least one to-be-recovered image;

training the image representation layer in advance by taking the at least one to-be-recovered image as a sample feature and taking the to-be-trained image as a sample label.

6. The method according to claim 5, wherein before training the image-text matching model, the method further comprises:

for a masked entity in any one of the at least one to-be-recovered image, masking information of the entity in the first text to obtain to-be-recovered text;

training the text representation layer in advance by taking the to-be-recovered text as a sample feature and taking the first text as a sample label.

7. The method according to claim 1, wherein generating the positive sample and the negative sample based on the set of the image-text corresponding relations comprises:

determining multiple corresponding relations in the set of the image-text corresponding relations, wherein any two of the determined multiple corresponding relations have different images and text;

for any one of the multiple corresponding relations, generating one positive sample based on text and an image in the corresponding relation; and based on the text in the corresponding relation and an image in another corresponding relation in the multiple corresponding relations, generating one negative sample.

8. The method according to claim 1, wherein generating the positive sample and the negative sample based on the set of the image-text corresponding relations comprises:

determining N corresponding relations in the set of image-text corresponding relations, wherein any two of the determined N corresponding relations have different images and text; and for each of the N corresponding relations, generating one positive sample based on text and an image in the corresponding relation; and generating N−1 negative samples based on the text in the corresponding relation and images in other N−1 corresponding relations in the N corresponding relations.

9. The method according to claim 1, wherein the text in the positive sample is used to describe at least one of an entity category or an entity attribute in the image in the positive sample; the text in the negative sample describes at least one of an entity category or an entity attribute that is/are inconsistent with an entity in the image in the negative sample.

10. The method according to claim 1, wherein a first loss weight is smaller than a second loss weight, and the second loss weight is smaller than a third loss weight;

wherein the first loss weight is a weight of a loss function when the first set of positive and negative samples is used to train the image-text matching model; the second loss weight is a weight of a loss function when the second set of positive and negative samples is used to train the image-text matching model; the third loss weight is a weight of a loss function when the third set of positive and negative samples is used to train the image-text matching model.

11. An image-text matching method, comprising:

acquiring a to-be-matched image;

acquiring at least one piece of preset text comprising preset content information; wherein the preset content information in different pieces of preset text is different;

inputting the to-be-matched image and the at least one piece of preset text into an image-text matching model, wherein the image-text matching model is obtained according to the training method for the image-text matching model in claim 1;

determining whether a piece of preset text for describing content of the to-be-matched image is presented according to an output result of the image-text matching model.

12. An electronic device, comprising:

at least one processor; and a memory communicatively connected to the at least one processor; wherein the memory stores an instruction executable by the at least one processor, and the instruction is executed by the at least one processor to cause the at least one processor to perform the method according to claim 1.

13. A non-transitory computer-readable storage medium storing a computer program, wherein the computer program is executed by the processor to implement the method according to claim 1.

14. A training method for an image-text matching model, comprising:

acquiring a positive sample and a negative sample; wherein the positive sample comprises text and an image, the text in the positive sample is used to describe content of the image in the positive sample; the negative sample comprises text and an image, the text in the negative sample describes content that is inconsistent with content of the image in the negative sample; and training the image-text matching model by using the acquired positive sample and the acquired negative sample based on a manner of contrastive learning;

wherein the image-text matching model is used to predict, for an input image and input text, whether the input text is used to describe content of the input image;

wherein the image-text matching model comprises: a text representation layer and an image representation layer;

the image-text matching model is used to: for the input text and the input image, acquire a text feature of the input text by using the text representation layer, acquire an image feature of the input image by using the image representation layer, and predict whether the input text is used to describe the content of the input image based on the acquired text feature and the acquired image feature;

wherein before training the image-text matching model, the method further comprises:

determining a position of at least one entity in a to-be-trained image according to entity information in first text for describing content of the to-be-trained image in advance;

masking at least one entity in the to-be-trained image to obtain at least one to-be-recovered image;

training the image representation layer in advance by taking the at least one to-be-recovered image as a sample feature and taking the to-be-trained image as a sample label.

* * * * *